United States Patent
Hu

(10) Patent No.: US 12,265,297 B2
(45) Date of Patent: Apr. 1, 2025

(54) BACKLIGHT MODULE

(71) Applicant: DARWIN PRECISIONS CORPORATION, Hsinchu County (TW)

(72) Inventor: Hsiang-I Hu, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 0 days.

(21) Appl. No.: 18/780,608

(22) Filed: Jul. 23, 2024

(65) Prior Publication Data

US 2025/0035979 A1  Jan. 30, 2025

(30) Foreign Application Priority Data

Jul. 26, 2023 (TW) .................................. 112127998

(51) Int. Cl.
G02F 1/00 (2006.01)
F21V 8/00 (2006.01)
G02F 1/13357 (2006.01)

(52) U.S. Cl.
CPC ....... G02F 1/133603 (2013.01); G02B 6/005 (2013.01); G02F 1/133605 (2013.01)

(58) Field of Classification Search
CPC .................................................. G02B 6/005
See application file for complete search history.

(56) References Cited

U.S. PATENT DOCUMENTS

| | | | | |
|---|---|---|---|---|
| 8,773,617 | B2* | 7/2014 | Choi | G02B 6/0083 349/58 |
| 9,019,444 | B2* | 4/2015 | Tang | G02B 6/0023 362/624 |
| 2010/0135003 | A1* | 6/2010 | Huang | G02F 1/133608 362/97.2 |
| 2011/0075397 | A1* | 3/2011 | Hsu | G02F 1/133615 362/97.1 |
| 2013/0044515 | A1* | 2/2013 | Lu Feng | G02B 6/0055 362/609 |
| 2024/0248247 | A1* | 7/2024 | Wang | G02F 1/1362 |

FOREIGN PATENT DOCUMENTS

| | | |
|---|---|---|
| TW | 200700797 A | 1/2007 |
| TW | 201020650 A1 | 6/2010 |
| TW | I402574 B1 | 7/2013 |
| TW | I456311 B | 10/2014 |

* cited by examiner

*Primary Examiner* — Gerald J Sufleta, II

(57) ABSTRACT

A backlight module includes a light guide plate, a light source, a low-reflective element, and a light-shielding element. The light guide plate has a light-incident surface, a light-exiting surface, and a bottom surface. The light source includes a circuit board and light-emitting elements. The circuit board is located on the light-exiting surface. The light-emitting elements are disposed on the circuit board and spaced apart. Each light-emitting element has a light-emitting surface. The low-reflective element is located on the bottom surface of the light guide plate and has a base part and extended parts. The extended parts are spaced apart and staggered the light-emitting elements. The light-shielding element is located between the circuit board and the light-exiting surface and includes adhesive members connecting the light-shielding element with the light guide plate. The adhesive members are spaced apart and staggered with the light-emitting elements.

10 Claims, 6 Drawing Sheets

BACKLIGHT MODULE

FIELD OF THE INVENTION

The present invention relates to a backlight module, and in particular to a backlight module for a liquid crystal display.

BACKGROUND OF THE INVENTION

A backlight module provides a surface light source to a display through a light guide plate. The light guide plate generally has a light guide structure formed by way of laser, printing, electroforming, etc., through which the light guide plate changes the travel direction of light and emits light. In a high-directive backlight module, a light guide plate generally has a light guide structure (such as a V-cut structure) that can effectively control a light-emitting angle. However, such high directivity of the light guide plate also easily leads to a hot spot phenomenon on a light incident side, a stronger emitting light, and the resulting light leakage problem.

SUMMARY OF THE INVENTION

The present invention provides a backlight module with good grade and picture performance.

The backlight module provided by the present invention includes a light guide plate, a light source, a low-reflective element, and a light-shielding element. The light guide plate has a light-exiting surface, a bottom surface, and a light-incident surface. The light-exiting surface is opposite to the bottom surface. Two opposite sides of the light-incident surface are connected to the light-exiting surface and the bottom surface, respectively. The light source includes a circuit board and a plurality of light-emitting elements. The circuit board is located on the light-exiting surface. The plurality of light-emitting elements are disposed on the circuit board, spaced apart, and arranged linearly. Each of the plurality of light-emitting elements has a light-emitting surface facing the light-incident surface. The low-reflective element is located on the bottom surface of the light guide plate. The low-reflective element has a base part and a plurality of extended parts. The base part is further located on a side of the light guide plate with the light-incident surface. The plurality of extended parts extends from the base part along a direction away from the light-incident surface. The plurality of extended parts is spaced apart and staggered with the plurality of light-emitting elements. The light-shielding element is located between the circuit board and the light-exiting surface. The light-shielding element includes a plurality of adhesive members connecting the light-shielding element with the light guide plate. The plurality of adhesive members are spaced apart and staggered with the plurality of light-emitting elements.

The present invention adopts the low-reflective element and the light-shielding element and therefore can eliminate the hot spot phenomenon and the light leakage problem. The low-reflective element of the present invention has the plurality of extended parts that are staggered with the plurality of light-emitting elements and the plurality of adhesive members of the light-shielding element are staggered with the plurality of light-emitting elements. Therefore, the backlight module is reliable, does not interfere with light emission and picture performance, and can improve the backlight grade and the picture performance.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF PREFERRED EMBODIMENTS

The foregoing and other technical contents and other features and advantages of the present invention will be clearly presented from the following detailed description of a preferred embodiment in cooperation with the accompanying drawings. Directional terms mentioned in the following examples, for example, upper, lower, left, right, front, back, top or bottom, are only used to describe directions referring to the attached drawings. Therefore, the directional terms used are for illustration and not for limitation. In addition, terms such as "first" and "second" involved in the description or claims are merely used for naming the elements or distinguishing different embodiments or ranges rather than limiting the upper limit or lower limit of the quantity of the elements.

Figure 1:
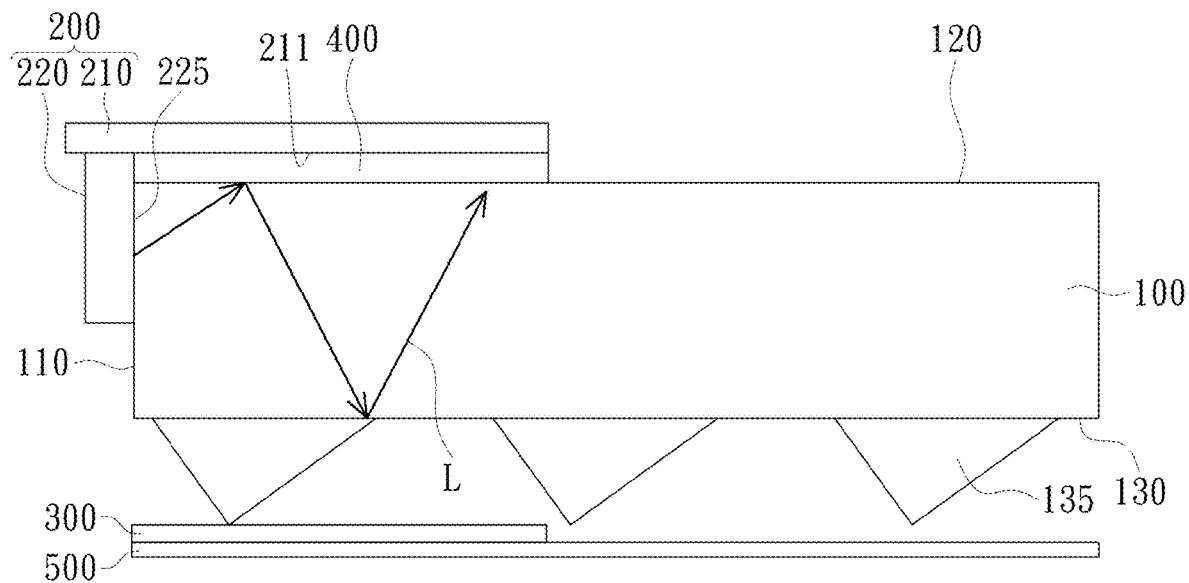
FIG. 1 is a sectional view of a backlight module of the first embodiment of the present invention.

The present invention provides a backlight module. In this embodiment of the present invention, as shown in FIG. 1, a backlight module 10 includes a light guide plate 100, a light source 200, a low-reflective element 300, and a light-shielding element 400. The light guide plate 100 has a light-incident surface 110, a light-exiting surface 120, and a bottom surface 130 opposite to the light-exiting surface 120. The two opposite sides of the light-incident surface 110 are respectively connected to the light-exiting surface 120 and the bottom surface 130 and receive the light emitted by the light source 200. The light guide plate 100 may further have a light guide structure 135 located on the bottom surface 130. The light guide structure 135 may be, for example, a V-cut, or random-number screen dots, and the present invention is not limited thereto. The low-reflective element 300 and the light-shielding element 400 are located on a side of the light guide plate 100 with the bottom surface 130 and a side of the light guide plate 100 with the light-exiting surface 120, respectively.

Figure 2:
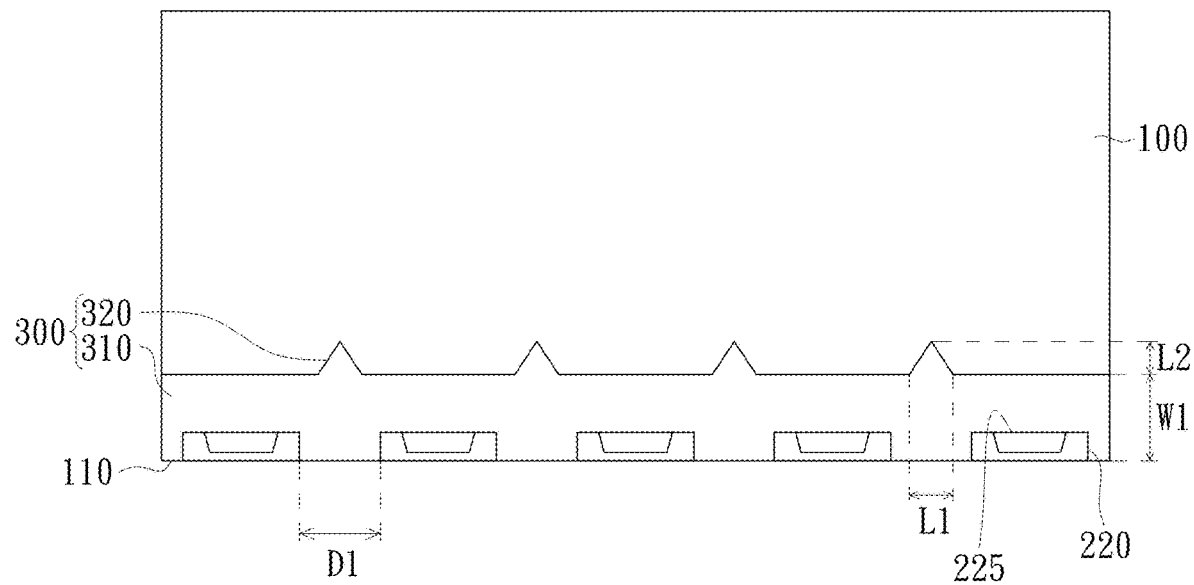
FIG. 2 is a partial top view of a backlight module of the first embodiment of the present invention.

FIG. 2 is a top view illustrating the relationship between the light source 200 and the low-reflective element 300. As shown in FIG. 2, the light source 200 includes a circuit board 210 and a plurality of light-emitting elements 220 disposed on the circuit board 210. In a preferred embodiment of the present invention, the light-emitting element 220 may be, for example, a light-emitting diode element and have a light-emitting surface 225 facing the light-incident surface 110. The plurality of light-emitting elements 220 are spaced apart and linearly arranged along the light-incident surface 110, where the adjacent two light-emitting elements 220 may, for example, be spaced apart a first distance D1 along an arrangement direction x of the light-emitting elements. Moreover, the light-emitting surface 225 further faces the light-incident surface 110, and there may be no substantial distance between them. The circuit board 210 may be preferably arranged on the light-exiting surface 120. That is, in this embodiment of the present invention, the light source 200 is preferably assembled in reverse order, where the circuit board 210 is located above the light-emitting elements 220 and disposed on the light-incident surface 110.

As shown in FIG. 1 and FIG. 2, the low-reflective element 300 is located on the side of the bottom surface 130 of the light guide plate 100 and has a base part 310 and a plurality of extended parts 320, where the plurality of extended parts 320 are located on the same side of the base part 310 and spaced apart. The low-reflective element 300 has low reflectivity and additionally may have light-absorbing properties. In this embodiment of the present invention, the low-reflective element 300 is further disposed on a side of the light guide plate 100 with the light-incident surface 110, where the base part 310 may be located below the light-incident surface 110 or the edge of the base part 310 is roughly aligned with the light-incident surface 110. Preferably, the base part 310 is also disposed on the light-incident surface 110 side along the plurality of light-emitting elements 220 arranged linearly. The plurality of extended parts 320 extends from the side of the base part 310 that is far away from the light-incident surface 110 along a direction y away from the light-incident surface 110.

As shown in FIG. 2, the plurality of extended parts 320 are preferably spaced apart and arranged substantially along the arrangement direction x of the plurality of light-emitting elements 220 and staggered with the plurality of light-emitting elements 220 along the direction x. That is, the extended parts 320 of the low-reflective element 300 are arranged below somewhere in front of an area between adjacent light-emitting elements 220. As such, the hot spot phenomenon between the adjacent light-emitting elements 220 caused by the light convergence is alleviated because of the low-reflective element 300. The low-reflective element 300 weakens the light-emitting efficiency between the adjacent light-emitting elements 220, thereby alleviating the problems concerning affected grade and picture performance caused by the hot spot phenomenon. In addition, the low-reflective element 300 is less likely to affect the visible area (not shown) because the extended parts 320, in principle, only correspond to the positions between the adjacent light-emitting elements 220 where the light converges and are staggered with the light-emitting elements 220.

The sizes and positions of the extended parts 320 may vary, for example, according to the light-emitting elements 220, the light-emitting surface 225, the first distance D1, etc. (for example, the type of the light-emitting elements 220, the size of the light-emitting surface 225, and the value of the first distance D1, etc.). In this embodiment of the present invention, as shown in FIG. 2, the base part 310 of the low-reflective element 300 has a first width W1, while the extended parts 320 of the base part have a first length L1 and a second length L2. The direction of the first length L1 is substantially the same as the direction x of the first distance D1, while the direction of the second length L2 and the direction of the first width W1 are substantially the same and both perpendicular to the direction of the first length L1. The first length L1 should not be greater than the first distance D1, and the percentage of the first length L1 to the first distance D1 is preferably greater than or equal to 80%. The second length L2 is preferably less than the first width W1. The second length L2 may vary according to the sizes and positions of hot spots and light rays at a light incident place.

The positioning of the extended parts 320 should not interfere with the visible area of a display device, and the variation of the distance between the extended parts 320 and the light-emitting surface 225 as well as the distance between the extended parts and the visible area may be realized by changing the position of the low-reflective element 300. For example, as shown in FIG. 2, the edge of the base part 310 of the low-reflective element 300 is roughly aligned with the light-incident surface 110. However, in other embodiments, the low-reflective element 300 may also be disposed in a direction y away from the light-incident surface 110, and the extended parts 320 are farther from the light-emitting surface 225 (or, the extended parts 320 are closer to the light-emitting surface 225). The appropriate position of the extended parts 320 with respect to the light-emitting surface 225 and the visible area may depend on the second length L2 thereof.

Figure 3:
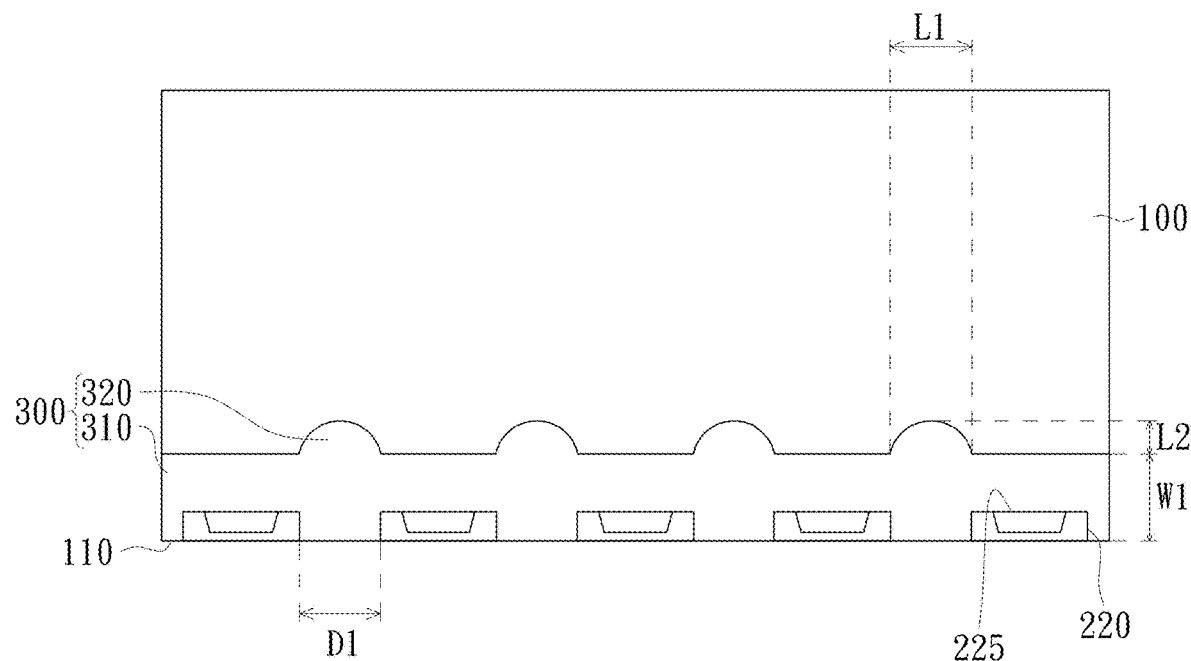
FIG. 3 is a partial top view of a backlight module of the second embodiment of the present invention.
Figure 3:
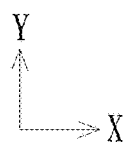

As shown in FIG. 2, the extended parts 320 are in the shape of a triangle, where the first length L1 is equivalent to the base length of the triangle, and the second length L2 is equivalent to the height of the triangle. However, the extended parts 320 may be in other shapes, such as a rectangle, a semicircle, or a trapezoid. As shown in FIG. 3, the shape of the extended parts 320 is similar to a semicircle, where the first length L1 thereof is nearly the first distance D1, but not greater than the first distance D1. The extended parts 320 on the same low-reflective element 300 may be in different shapes. In this embodiment of the present invention, for example, the low-reflective element 300 may be a low-reflective film sheet, a light-absorbing film sheet, or a low-reflective adhesive tape, a light-absorbing adhesive tape, and maybe a dark film sheet or an adhesive tape.

Figure 4:
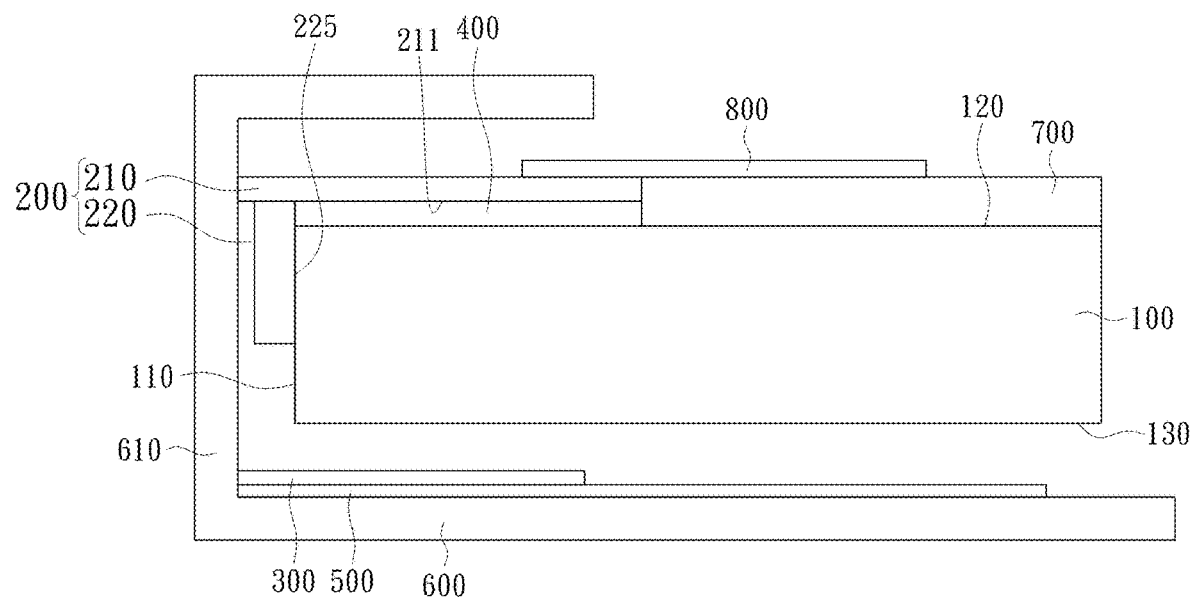
FIG. 4 is a sectional view of a backlight module of the third embodiment of the present invention.

In several embodiments of the present invention, as shown in FIG. 4, the backlight module 10 may further include a backplate 600 and a reflecting sheet 500. The backplate 600 is provided for the arrangement of the reflecting sheet 500, the low-reflective element 300, the light guide plate 100, the light source 200, and the light-shielding element 400. The reflecting sheet 500 is disposed on the bottom surface 130 side of the light guide plate 100 and may be used to reflect the light emitted from the bottom surface 130 of the light guide plate 100, which helps reduce light loss. In several embodiments of the present invention, the dark adhesive tape serving as the low-reflective element 300 may be adhered to the reflecting sheet 500. The low-reflective element 300 may be disposed along a side wall 610 of the backplate 600. As shown in FIG. 4, the base part 310 of the low-reflective element 300 may protrude from the light-incident surface 110 and lean against the side wall 610.

Figure 5:
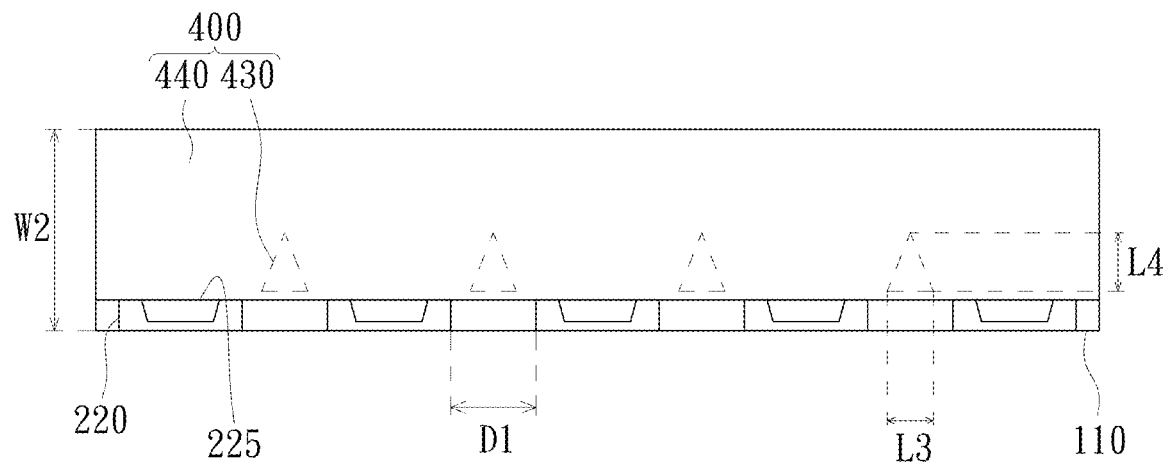
FIG. 5 is another partial top view of the backlight module of the first embodiment of the present invention.

In addition, the light-shielding element 400 is located on a side of the light guide plate 100 with the light-exiting surface 120. In this embodiment of the present invention, as shown in FIG. 1, the light-shielding element 400 is further disposed on a side of the light guide plate 100 with the light-incident surface 110, preferably located between the circuit board 210 of the light source 200 and the light-exiting surface 120 of the light guide plate 100. FIG. 5 is a top view illustrating the relationship between the light source 200 and the light-shielding element 400. As shown in FIG. 5, the light-shielding element 400 comprises a plurality of adhesive members 430 used to connect the light-shielding element 400 with the light guide plate 100. The plurality of adhesive members 430 are spaced apart and substantially staggered along the direction x with the plurality of light-emitting elements 220.

As shown in FIG. 1 and FIG. 5, in this embodiment of the present invention, the light-shielding element 400 is further disposed on a surface 211 of the circuit board 210 facing the light-exiting surface 120. In other words, the surface 211 of the circuit board 210 facing the light-exiting surface 120 is coated with light-shielding material. Moreover, the light-shielding element 400 may also have light-absorbing properties. As such, the light emitted from the light-incident surface 110 side of the light guide plate 100 may be reduced because of the light-shielding element 400. The light leakage and problems concerning affected grade and picture performance caused by the light leakage are alleviated because of the light-shielding element 400.

The light-shielding element 400 may further cover the surface 211 of the circuit board 210. In this embodiment of the present invention, as shown in FIG. 1 and FIG. 5, the light-shielding element 400 has a second width W2, and the second width W2 may be substantially equivalent to the width of the surface 211. The adhesive members 430 are further located on a side of the light-shielding element 400 that is far from the surface 211 and has a third length L3 and a fourth length L4. The direction of the third length L3 is substantially the same as the direction x of the first distance D1, while the direction of the fourth length L4 and the direction of the second width W2 are substantially the same and both are perpendicular to the direction of the third length L3. The third length L3 should not be greater than the first distance D1, and the percentage of the third length L3 to the first distance D1 is preferably greater than or equal to 80%. The fourth length L4 is preferably less than the second width W2. In this embodiment of the present invention, the plurality of adhesive members 430 is staggered with the plurality of light-emitting elements 220, and therefore, the adhesive members 430 will interfere with a light path to a lesser degree. For example, such a stagger arrangement can prevent lights from the light source 200 from being cast directly to the adhesive members 430, thereby preventing the adhesive member 430 from attenuating total reflection, and avoiding hot spots caused by emitted lights after light is cast on the adhesive members 430.

As shown in FIG. 5, the adhesive members 430 are in the shape of a triangle. However, the adhesive members 430 may be in other shapes, such as a rectangle. Moreover, the plurality of adhesive members 430 on the same light-shielding element 400 may be in the same shape or in different shapes. For example, the adhesive members 430 may be a dual-sided adhesive tape and maybe a regular transparent adhesive or a dark adhesive. The adhesive members 430 with the dark adhesive can achieve a light-absorbing effect. The positioning of the adhesive members 430 should not interfere with a light path L. In this embodiment of the present invention, the adhesive members 430 are further located on a side of the light-shielding element 400 that is close to the light-emitting surface 225.

The light-shielding element 400 further includes at least one light-shielding film sheet, for example, a dark film sheet or a light-shielding adhesive tape such as a dark adhesive tape. For example, the dark film sheet or adhesive tape may be black or grey film sheet or adhesive tape. In the embodiment of FIG. 1 and FIG. 5, the light-shielding element 400 further includes a light-shielding adhesive tape 440. The light-shielding adhesive tape 440 is a single-sided adhesive tape, and the side with adhesiveness thereof faces the circuit board 210 and sticks the light-shielding element 400 to the surface 211. The adhesive members 430 are disposed on the side of the light-shielding adhesive tape 440 that is far from the surface 211 and fix the light-shielding element 400 to the light-exiting surface 120 of the light guide plate 100.

Figure 6:
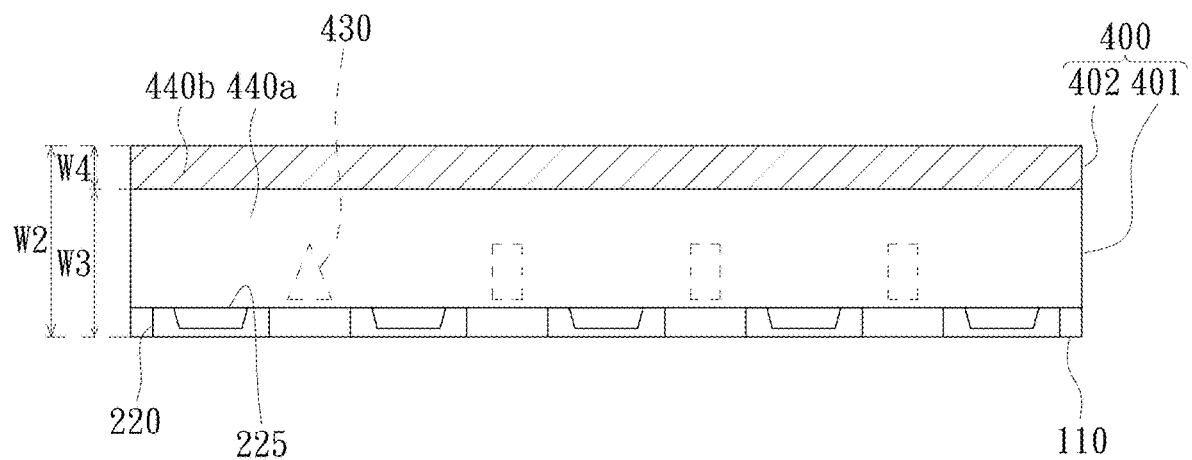
FIG. 6 is a partial top view of a backlight module of the fourth embodiment of the present invention.
Figure 6:
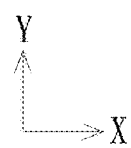

In other embodiments of the present invention, as shown in FIG. 6, the light-shielding element 400 has a first light-shielding part 401 and a second light-shielding part 402. The second light-shielding part 402 is parallel to the first light-shielding part 401 and is farther away from the light-incident surface 110 with respect to the first light-shielding part 401. The plurality of adhesive members 430 are disposed on the first light-shielding part 401 and connect the light-shielding element 400 with the light guide plate 100. In this embodiment of the present invention, the width W3 of the first light-shielding part 401 in the direction of the second width W2 is greater than the width W4 of the second light-shielding part 402, and the percentage of the width W4 to the second width W2 is preferably less than 50%.

As shown in FIG. 6, the color of the first light-shielding part 401 and the color of the second light-shielding part 402 may be different. In several embodiments of the present invention, the light-shielding element 400 further includes a light-shielding adhesive tape 440a and a light-shielding adhesive tape 440b. The light-shielding adhesive tape 440a has a second width W2 and may be adhered to the surface 211, and the range of the light-shielding adhesive tape 440a may be substantially the same as that of the light-shielding element 400. The light-shielding adhesive tape 440b has a fourth width W4 and may be adhered to the side of the light-shielding adhesive tape 440b which is far from the surface 211. The light-shielding adhesive tape 440b is preferably disposed on the side of the light-shielding adhesive tape 440a that is far from the light-emitting surface 225. The color of the light-shielding adhesive tape 440a and the color of the light-shielding adhesive tape 440b may be the same or different. In several embodiments of the present invention, for example, the light-shielding adhesive tape 440a may be grey, while the light-shielding adhesive tape 440b may be grey or black, and the light-shielding adhesive tape 440b and the light-shielding adhesive tape 440a may form a darker second light-shielding part 402 when overlapped with each other.

In several embodiments of the present invention, as shown in FIG. 3, the backlight module 10 may further include a deflecting film 700. The deflecting film 700 is disposed on the light-exiting surface 120 of the light guide plate 100 and is used to change the direction of the emitted lights (e.g., change the direction of the emitted lights to the direct viewing direction). The deflecting film 700 may be disposed adjacent to the circuit board 210. In this embodiment of the present invention, an adhesive tape 800 may be further disposed where the deflecting film 700 contacts the circuit board 210. The adhesive tape 800 is preferably a dark adhesive tape, which not only fixes the deflecting film 700 but also prevents the light leakage of the light guide plate 100 near the light-incident surface 110.

According to the embodiment of the present invention, the low-reflective element 300 is disposed on the bottom surface 130 side of the light guide plate 100, the light-shielding element 400 is disposed on the light-exiting surface 120, the low-reflective element 300 has a plurality of extended parts 320, the plurality of extended parts 320 are arranged along the direction x and staggered with the plurality of light-emitting elements 220, and the light-shielding element 400 comprises a plurality of adhesive members 430 staggered with the plurality of light-emitting elements 220. Therefore, the hot spot phenomenon and the light leakage problem can be overcome and solved. In addition, according to the embodiment of the present invention, the provision of the low-reflective element 300 and the light-shielding element 400 does not lead to obstructive emitted lights or poor picture performance, and thus the backlight module is reliable and helps improve the backlight grade and the picture performance.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A backlight module, comprising:
   a light guide plate, having a light-exiting surface, a bottom surface, and a light-incident surface, wherein the light-exiting surface is opposite to the bottom surface, and two opposite sides of the light-incident surface are connected to the light-exiting surface and the bottom surface, respectively;
   a light source, comprising a circuit board and a plurality of light-emitting elements, wherein the circuit board is located on the light-exiting surface, the plurality of light-emitting elements are disposed on the circuit board, spaced apart, and arranged linearly, and each of the plurality of light-emitting elements has a light-emitting surface facing the light-incident surface;
   a low-reflective element, located on the bottom surface of the light guide plate, wherein the low-reflective element has a base part and a plurality of extended parts, the base part is further located on a side of the light guide plate with the light-incident surface, and the plurality of extended parts extend from the base part along a direction away from the light-incident surface, and the plurality of extended parts is spaced apart and staggered with the plurality of light-emitting elements; and
   a light-shielding element, located between the circuit board and the light-exiting surface, wherein the light-shielding element comprises a plurality of adhesive members connecting the light-shielding element with the light guide plate, and the plurality of adhesive members are spaced apart and staggered with the plurality of light-emitting elements.

2. The backlight module according to claim 1, wherein the base part of the low-reflective element is further disposed on a side of the light guide plate with the light-incident surface along the plurality of light-emitting elements arranged linearly, the plurality of light-emitting elements are spaced apart a first distance, each of the extended parts of the low-reflective element has a first length along a direction of the first distance, and the first distance is greater than the first length.

3. The backlight module according to claim 2, wherein each of the extended parts has a second length along a direction perpendicular to the light-incident surface, the base part of the low-reflective element has a first width along a direction of the second length, and the second length is less than the first width.

4. The backlight module according to claim 1, further comprising a reflecting sheet, wherein the reflecting sheet is located on the bottom surface of the light guide plate, and the low-reflective element is disposed between the reflecting sheet and the bottom surface.

5. The backlight module according to claim 1, wherein the light-shielding element is further disposed on a side of the light guide plate with the light-incident surface along the plurality of light-emitting elements arranged linearly, the plurality of light-emitting elements are spaced apart a first distance, each of the adhesive members has a third length along a direction of the first distance, and a percentage of the third length to the first distance is greater than or equal to 80%.

6. The backlight module according to claim 1, wherein the light-shielding element is further disposed on a surface of the circuit board facing the light exiting surface.

7. The backlight module according to claim 1, wherein the light-shielding element further has a first light-shielding part and a second light-shielding part, the second light-shielding part is parallel to the first light-shielding part and is farther away from the light-incident surface with respective to the first light-shielding part, and the plurality of adhesive members are further disposed on the first light-shielding part and connect the light-shielding element with the light guide plate.

8. The backlight module according to claim 6, wherein the light-shielding element is further adhered to the circuit board and covers the surface.

9. The backlight module according to claim 7, wherein a width of the first light-shielding part along a direction perpendicular to the light-incident surface is greater than a width of the second light-shielding part along the direction.

10. The backlight module according to claim 7, wherein a color of the first light-shielding part and a color of the second light-shielding part are the same or different, and the color of the second light-shielding part and the color of the first light-shielding part are dark.

\* \* \* \* \*